Aug. 22, 1967  F. W. LEBOW  3,336,885
MOLD BOARD PLOW SEED PLANTER ATTACHMENT
Filed Sept. 17, 1964  3 Sheets-Sheet 1
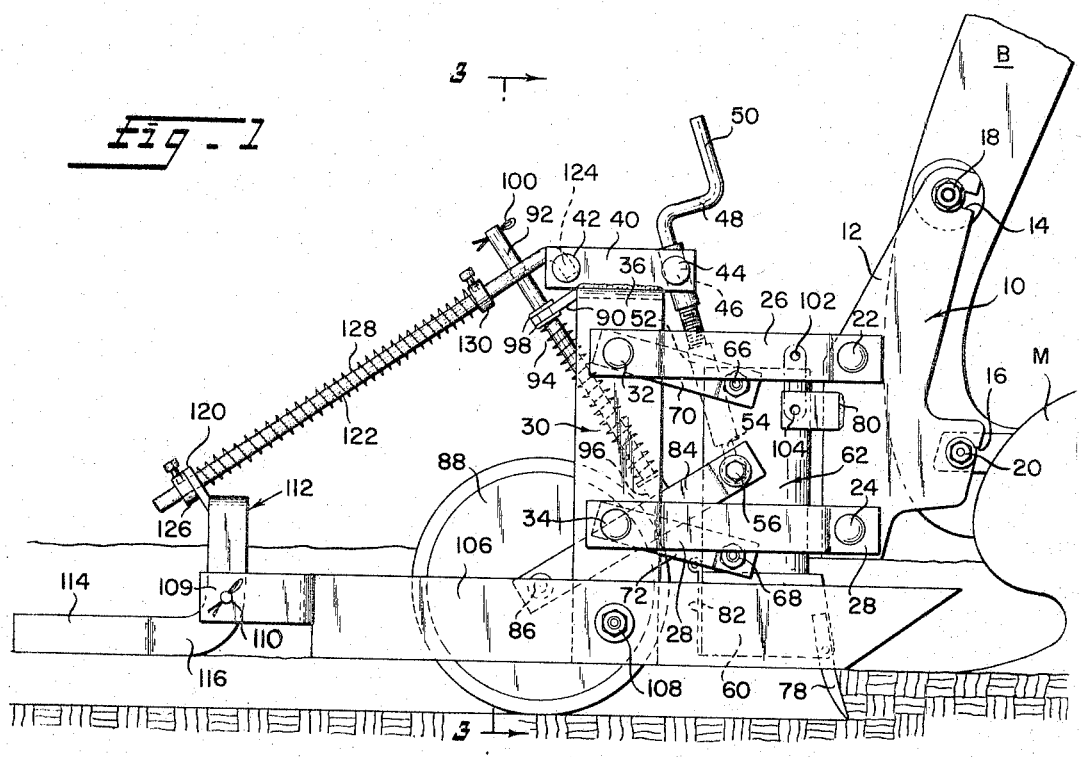
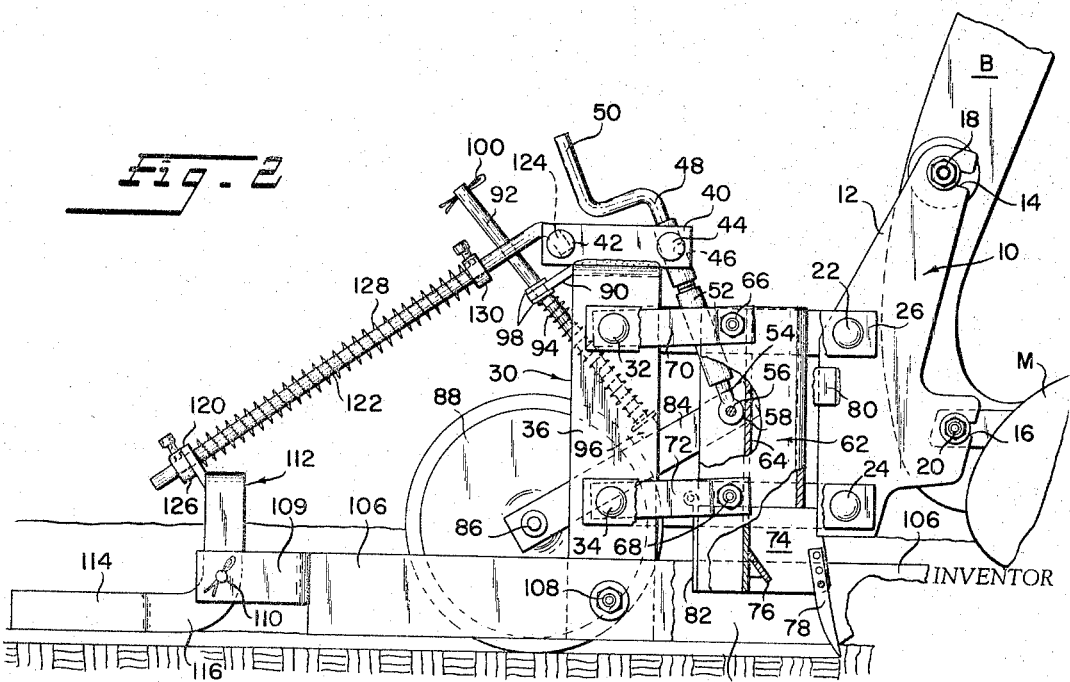
INVENTOR
Fennie Woodroe Lebow
BY
Schlesinger, Schlesinger & Arkwright ATTORNEYS Aug. 22, 1967   F. W. LEBOW   3,336,885
MOLD BOARD PLOW SEED PLANTER ATTACHMENT
Filed Sept. 17, 1964   3 Sheets-Sheet 3
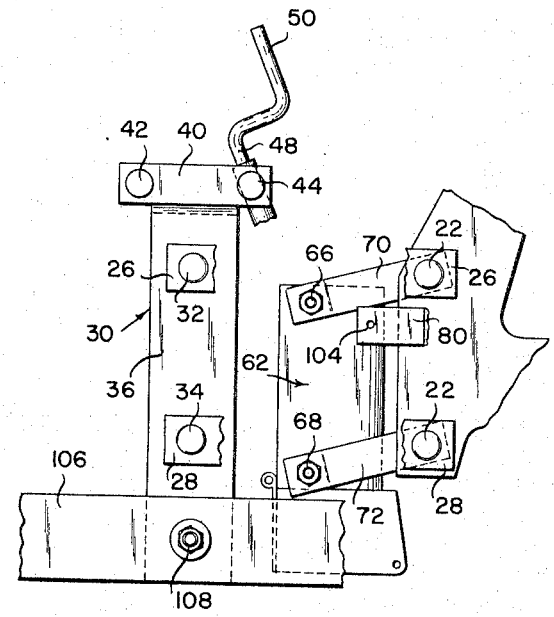
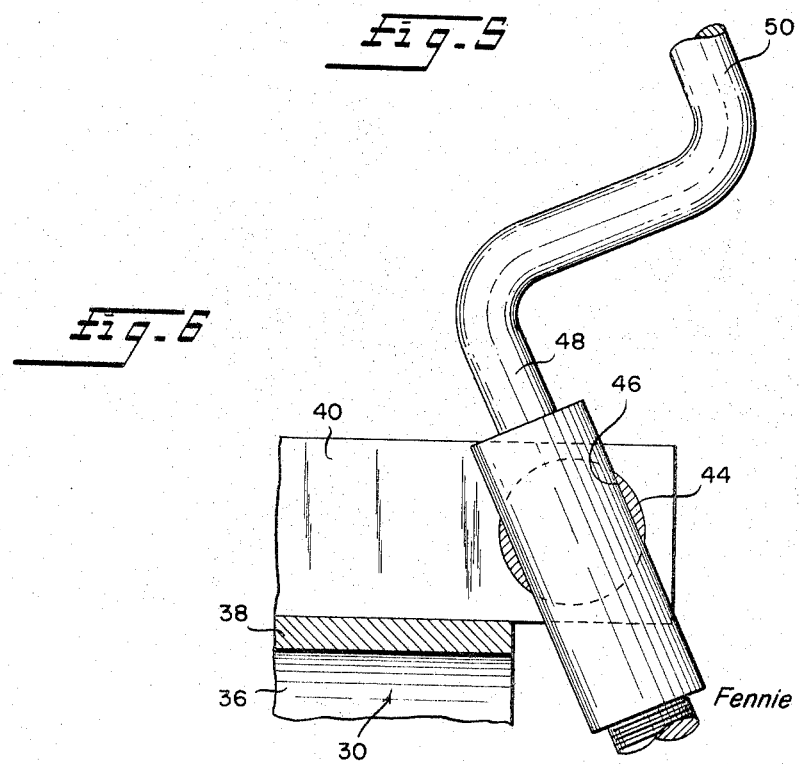
INVENTOR
Fennie Woodroe Lebow
BY *Shlesinger, Shlesinger + Arkwright*
ATTORNEYS

United States Patent Office 3,336,885
Patented Aug. 22, 1967

3,336,885
MOLD BOARD PLOW SEED PLANTER
ATTACHMENT
Fennie Woodroe Lebow, Box 663, Morton, Tex. 79346
Filed Sept. 17, 1964, Ser. No. 397,096
25 Claims. (Cl. 111—85)

This invention relates to seed planting attachments and devices to be affixed to a mold board plow or the like for accurately placing the seed in a furrow at all times at a constant depth in the ground.

Devices as heretofore known have many weaknesses. One of the problems has been that prior art planters failed to control the depth at which the seed was planted at all times during the planting operation. When the mold board plow would go over a rise or into a hollow, the planter would tend to lift out of or bury deeper into the ground. Where the terrain is rolling, a considerable amount of seed is lost by being planted too deep or too shallow. Nonuniformity in planting also produces defects in many portions of the crop which does germinate and grow.

Devices have been adapted for raising or lowering the opening or follower plows in order to adjust for differences in terrain. None of these devices have been readily adjustable by a simple hand cranking or rotating movement. Many of the devices presently in use require the farmer to remove a wedge or to drive the follower plow deeper into the ground by means of a hammer applied to a shim or wedge backing up the plow blade. Because of the time consumed, many of the farmers will not take the time to adjust the opening plow to accommodate variations in terrain. This is particularly true where gang plows are used. In the Plains States, as many as six mold board plows and their opening plows are utilized drawn by a single tractor. If the farmer is to adjust the opening plows for variations in terrain, and if the adjustment is one which is difficultly made, he will leave the plows at a constant setting because of the time loss in endeavoring to adjust them. It is therefore an object of this invention to provide a device which may be readily attached to the standard mold board plow for planting seed which will maintain the seed at a constant depth beneath the surface of the ground regardless of terrain.

Another object of this invention is to provide a planting mechanism which may be attached readily to any one of the available mold board plows on the market or contemplated.

A further object of this invention is to provide an attachment for mold board plows which has a minimum number of parts all of which are simple and readily manufactured. This is particularly advantageous as the farmer frequently has to make his own parts for replacement purposes. The less complex the equipment, the more adaptable to the farmers requirements and the less costly to maintain.

A further object of this invention is to provide an adapter for mold board plows and the like which may be readily assembled and disassembled.

Yet a further object of this invention is to provide an attachment for mold board plows which makes the furrow for the seed and covers it up.

Still another object of this invention is to provide a gauge which rides on the ground and which controls the depth of the opening or follower plow.

Another object of this invention is to provide an attachment for mold board plows having means for readily and simply raising and lowering the opening plow.

These and other objects of this invention will be apparent from the following description and claims.

In the drawings which represent by way of illustration the various embodiments of this invention, FIGURE 1 is a side elevational view of the attachment connected to a mold board plow.

FIGURE 2 is a side elevational view similar to FIGURE 1 with parts broken away for purposes of illustration and showing the plow set for digging a shallower furrow.

FIGURE 5 is a fragmentary view showing an alternative linkage hook up as taught by this invention.

FIGURE 6 is an enlarged fragmentary sectional view showing the crank handle structure.

Figure 3:
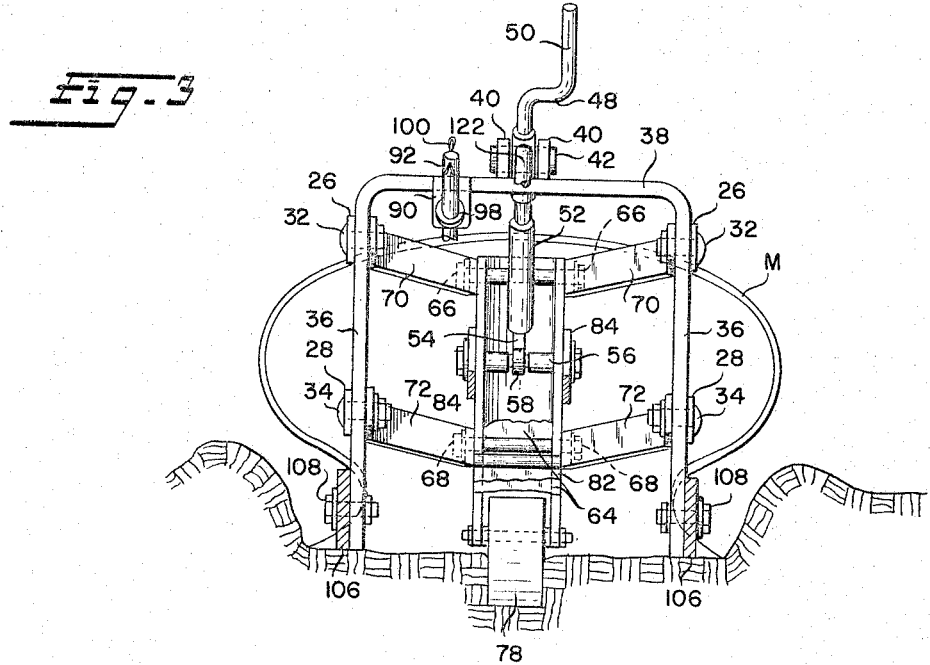
FIGURE 3 is a sectional view taken substantially on the line 3—3 of FIGURE 1 viewed in the direction of the arrows with certain parts omitted for purposes of illustration.
Figure 4:
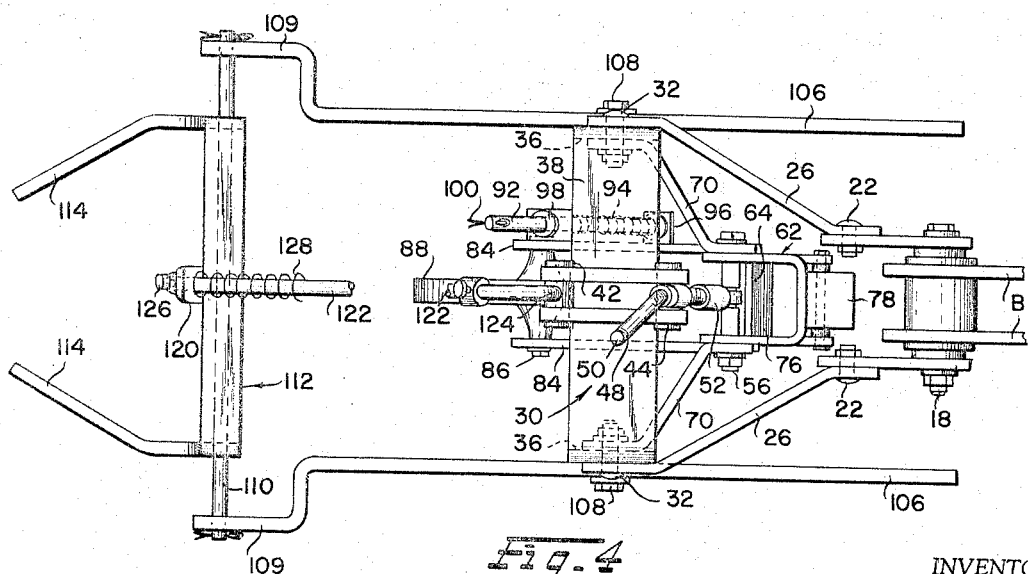
FIGURE 4 is a top plan view of the apparatus of FIGURE 1 with certain parts broken away for purposes of illustration.

In FIGURE 1, the mold board M is mounted on a tool bar (not shown) by means of a lister beam B. A bracket 10 having side bracket members 12 with hook openings 14 and 16 is hooked onto studs 18 and 20 projecting from either side of the lister beam B. The side bracket members 12 are interconnected by a cross piece (not shown). The bracket 10 may be single integral piece, or it may comprise several pieces. A pair of studs or lugs 22 and 24 pivotally secure links 26 and 28 to the bracket 10. The links 26 and 28 are generally parallel and extend rearwardly for connection to a U-shaped support bracket 30 by means of lugs 32 and 34. The U-shaped bracket member 30 comprises legs 36 and cross piece 38. Secured to the cross member 38 are two vertical and upstanding journal members 40. Pins 42 and 44 extend through the upstanding braces 40. The pin 44 has a drilled hole 46 for receiving a rotating rod 48 operated by means of a crank 50. The rod 48 is threadably connected to a sleeve 52 on a rod 54 the end of which is connected to a pin 56 which has been passed through openings 58 in the walls 60 of a seed planter or hopper assembly 62. The assembly 62 has extending side walls. Between the side walls is a rear wall or plate 64. Behind the plate 64 and in the side walls of the seed box assembly 62 are lugs 66 and 68 which pivotally secure small links 70 and 72 to the bracket 30 at the lugs 32 and 34. On the wall 64 of the seed box or spout assembly 62 and inside of the chute 74 is a seed deflector 76. In advance of the seed hopper or chute assembly 62 is an opening or following plow 78. The following plow 78 is about the same width as the seed hopper or chute 74. The blade or follower plow 78 may be bolted or clamped or otherwise secured to the seed box assembly 62. Means (not shown) may be provided for adjustment of the blade or opening plow 78 when it has worn down. A set screw or clamp could be provided for performing this function.

On the brackets 10 are located link stop members 80 which limit the downward travel of the links 26 and 28.

The seed chute 74 is provided at the bottom rear end portion with a flap valve 82. The flap valve 82 is hinged to the back plate 64 so as to hinge in a forward direction in order to prevent dirt from being carried up into the feed chute 74 should the tractor carrying the plow M and its attachment be backed up.

The pin 56 in addition to supporting the rotary rod 52 also serves to support the ends of braces 84 having at their ends a pin or axle 86 on which is mounted a press wheel or press disc 88. A strap 90 is secured to the cross member 38 of the U-shaped member at the rear end thereof. The strap 90 is provided with a hole therein for receiving a rod 92. The rod 92 has mounted thereon a compression spring 94. The rod 92 is threaded or otherwise secured in a fitting 96 which is mounted by means of welding or the like on one of the straps 84. Washers 98 are secured on the rod 92 on either side of the strap 90 to avoid binding of the spring 94 on the shaft or rod 92. A cotter pin 100 prevents the rod 92 from slipping through the opening in the strap 90.

It should be noted that the link 26 and the stop member 80 shown in FIGURE 1 are provided with holes 102 and 104. A small brace having holes at either end thereof (not shown) is provided for bolting the link 26 to the stop member 80 to prevent displacement of the entire assembly in a vertical direction.

Secured to the legs 36 of the U-shaped brace at the bottom thereof are guide gauges or runners 106. Bolts 108 tie the runners 106 to the legs 36.

The runners 106 may vary in size and shape depending upon the type of soil and terrain. At the rear of the runners or gauges 106 are L-shaped extensions 109. The L-shaped extensions 109 are provided with holes for receiving a pintle 110. Mounted on the pintle 110 is a ground covering member 112 having a pair of leg members 114 which extend towards one another. The member 112 is angled at its pivot point 116. Cotter pins 118 keep the pintle 110 from sliding from the L-shaped brackets 109 of the runners 106.

On the covering member 112 is a strap member 120. The strap member has a hole therein for receiving a rod 122. The rod 122 is bent at its upper end as at 124 for receipt in a hole of the pin 42. A sleeve 126 is provided with a set screw at the end of the rod 122 and on the far side of the strap 120 for limiting the downward travel of the covering member. A compression spring 128 is mounted on the rod 122 for maintaining downward pressure on the ground covering member 112. A sleeve 130 with a set screw adjusts the tension of the spring 128 on the rod 122.

*Operation*

In operation, the opening or follower plow 78 which is secured to the seed chute 74 is raised or lowered when the crank 50 is turned in the proper direction as desired. Since the links 70 and 72 raise and lower with respect to the U-shaped bracket, the depth of the blade can be controlled providing either the links 26 and 28 are locked in a fixed plane by means of the brace heretofore mentioned secured to holes 102 and 104 or if unsecured, the runners 106 are mounted on the U-shaped member. The runners engage the bottom of the furrow and travel thereon. Since the runners 106 are pivotally connected to the mold board plow M by the links 26 and 28, raising and lowering of the mold board plow over hills and hollows will not change the depth of the blade 78 due to the fact that the linkage is not solidly connected to the mold board plow but rather pivotally connected. Since the runners 106 will at all times follow the contour of the ground, it will now be obvious that the depth at which the blade or following plow 78 can be set will be determined by the amount of rotation of the crank handle 50 in either direction as desired. The press wheel which travels behind the seed box, will press the seed into the furrow cut by the blade 78. After the seed has been pressed into the ground, the covering member 112 will pull earth back down upon the furrow cut by the blade 78 and cover the seed. The tension springs 94 and 128 will tend to maintain the press wheel 88 and the covering arms 114 down upon the soil.

It will be obvious that any of the pivots illustrated in the drawings may be bolts which may be removable so that parts may be replaced when worn. The seed which falls into the chute 74 bounces on the deflector 76 and is propelled forward directly beneath the follower plow 78 in order to insure that it is properly positioned. Since some of the earth about the follower plow 78 will tend to fall back into the furrow it cuts, it is important that the seed be brought as close as possible into the vicinity of the rear of the blade 78.

FIGURE 5 illustrates how the links 70 and 72 may be connected to the pivots or pins 22 and 66 and 68 without appreciably altering the mechanisms operation.

When it is desired merely to use the seed box assembly without the runners and the covering member, they are removed by merely unscrewing the nuts or removing the cotter pins as the case may be. The rod 122 may be readily disconnected from the pin 42 as will be obvious. When the runners have been removed, the linkages 26 and 28 must be rigidly secured. This is done by means of the aforementioned brace (shown in phantom lines in FIGURE 1) by bolts inserted into the holes 102 and 104. Fixing the linkages 26 and 28 permits raising and lowering of the seed box assembly 62 by means of the crank 50 as will be obvious.

If desired, the entire assembly can be removed from the beam B by merely removing the lugs or nuts 18 and 20 and removing the bracket 10 therefrom.

While the invention has been described it will be understood that it is capable of further modifications and this application is intended to cover any variations, uses, or adaptations of the invention following in general, the principles of the invention and including such departures from the present disclosure as come within knowledge or customary practice in the art to which the invention pertains, and as may be applied to the essential features hereinbefore set forth and as fall within the scope of the invention or the limits of the appended claims.

Having thus described my invention what I claim is:

1. A plow assembly for a farm implement and the like, comprising:
    (a) runner means which rests on and moves over the ground surface;
    (b) upright structural support means rigidly mounted on said runner means;
    (c) linkage means pivotally connecting said support means and said farm implement for allowing the entire support assembly and said runner means to move vertically with respect to said farm implement;
    (d) plow means pivotally connected to said support means and which extends down into the ground adjacent said runner means; and
    (e) plow height control means connecting said upright structural support means and said plow means for fixing a desired relative depth of cut of said plow means with respect to said runner means, whereby said plow will always be held at a fixed depth in the ground with respect to said runner for all variations in height of the farm implement as it moves over uneven terrain.

2. The plow assembly for farm implement and the like as set forth in claim 1, wherein:
    (a) said runner means includes two elongated, spaced members disposed parallel to each other.

3. The plow assembly for a farm implement and the like as set forth in claim 1, wherein:
    (a) said upright structural support means is an inverted U-shaped bracket, the lower ends of which are connected to said runner means.

4. The plow assembly for a farm implement and the like as set forth in claim 1, wherein:
    (a) said linkage means includes a plurality of links forming a parallel linkage connection.

5. The plow assembly for a farm implement and the like as set forth in claim 1, wherein:
    (a) said plow means includes a linkage assembly having at least two vertically spaced links which support the plow blade in a substantially vertical position for all heights of the blade.

6. The plow assembly for a farm implement and the like as set forth in claim 1, wherein:
    (a) said plow height control means includes a threaded crank rod and sleeve assembly which is pivotally connected at one end to said upright structure support means and at the other end to said plow means.

7. The plow assembly for a farm implement and the like as set forth in claim 1, wherein:
(a) said runner means has a ground covering assembly pivotally connected to the rear thereof; and
(b) said plow means has a spring-biased press wheel assembly pivotally mounted on said plow means.

8. The plow assembly for a farm implement and the like as set forth in claim 1, wherein:
(a) said plow means includes a vertically disposed seed hopper assembly pivotally supported to said upright structural support means by a parallel type linkage; and
(b) a follower plow which is rigidly mounted on the lower portion of said seed hopper.

9. An attachment for farm implements and the like including
(a) two pairs of first links
(b) one pair of said first links for connection to and extension rearwardly from each side of said farm implement
(c) a vertical bracket member
(d) one pair of said first links connected to each side of said bracket member
(e) a seed box and follower plow assembly including a seed box mounted behind a follower plow
(f) two pairs of second links
(g) one pair of said second links connected on each side of said assembly and each pair of second links connected to a pair of first links,
(h) and crank means swivelly connected to said bracket member and to said assembly whereby when said crank means is rotated, said assembly moves vertically up and down with respect to said mold board plow.

10. In combination with a farm implement and the like including
(a) two pairs of first links
(b) one pair of said first links connected to and extending rearwardly from each side of said farm implement
(c) a vertical bracket member
(d) one pair of said first links connected to each side of said bracket member
(e) a seed box and follower plow assembly including a seed box mounted behind a follower plow
(f) two pairs of second links
(g) one pair of said second links connected on each side of said assembly and each pair of second links connected to a pair of first links,
(h) and crank means swivelly connected to said bracket member and to said assembly whereby when said crank means is rotated, said assembly moves vertically up and down with respect to said moldboard plow.

11. In combination with a farm implement and the like as in claim 10 and including
(a) a press wheel connected to said assembly, and
(b) spring means connected to said press wheel and bracket member for urging said press wheel against the ground.

12. An attachment for a farm implement and the like as in claim 9 and including
(a) a press wheel connected to said assembly, and
(b) spring means connected to said press wheel and bracket member for urging said press wheel against the ground.

13. An attachment for a farm implement and the like including
(a) two pairs of first links (b) one pair of first links for connection to and extending rearwardly from each side of said farm implement
(c) a vertical bracket member
(d) one pair of said first links connected to each side of said bracket member
(e) a seed box and follower plow assembly including a seed box mounted behind said follower plow
(f) two pairs of second links
(g) one pair of said second links connected on each side of said assembly and each pair of second links connected to a pair of first links
(h) crank means swivelly connected to said bracket member and to said assembly whereby when said crank means is rotated, said assembly moves up and down with respect to said farm implement, and
(i) ground engaging gauge means secured to said bracket member for supporting said bracket member on said ground.

14. An attachment as in claim 13 and including
(a) covering means pivotally connected to said ground engaging gauge means.

15. An attachment as in claim 14 and including
(a) spring means connected to said bracket member for urging said covering means into engagement with the ground.

16. An attachment as in claim 15 and including
(a) a press wheel secured to said assembly.

17. An attachment as in claim 16 and including
(a) spring means connected to said bracket member for urging said press wheel against the ground.

18. An attachment as in claim 17 and including
(a) stops for limiting the downward travel of said pairs of first links.

19. An attachment as in claim 18 and wherein
(a) said ground engaging gauge, said covering means, said press wheel and said spring means are disconnectable.

20. An attachment as in claim 13 and wherein
(a) said assembly includes a seed deflector and a pivoted anti-dirt clog plate.

21. An attachment as in claim 13 and wherein
(a) said crank means includes a threaded shank and sleeve.

22. An attachment as in claim 13 and wherein
(a) said bracket member is U-shaped and includes a journal for receiving said crank means.

23. An attachment as in claim 13 and wherein
(a) said ground engaging means includes a pair of spaced runners removably secured to said bracket member.

24. An attachment as in claim 13 and wherein
(a) said seed box is about the same width as said follower plow.

25. An attachment as in claim 24 and wherein
(a) said ground engaging gauge means includes a pair of spaced runners outboard of said seed box and follower plow assembly.

References Cited

UNITED STATES PATENTS

| Re. 6,078 | 10/1874 | Luse | 111—83 X |
| 1,155,418 | 10/1915 | Hembree | 172—665 |
| 2,416,189 | 2/1947 | McIntyre | 111—85 |
| 2,694,356 | 11/1954 | Haas | 111—85 X |

ABRAHAM G. STONE, *Primary Examiner.*

A. E. KOPECKI, *Assistant Examiner.*